Patented Sept. 9, 1924.

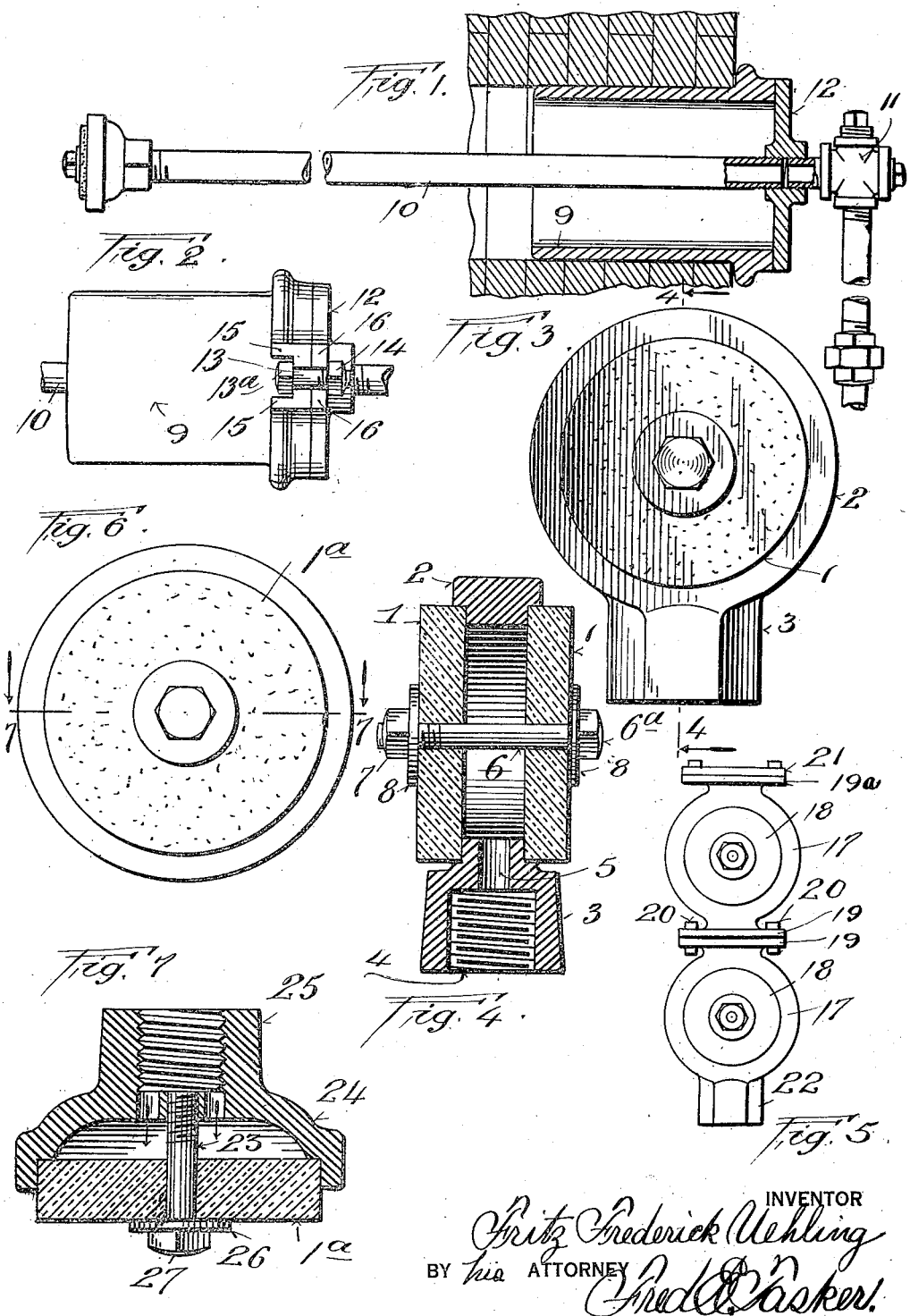

1,508,034

UNITED STATES PATENT OFFICE.

FRITZ FREDERICK UEHLING, OF PASSAIC, NEW JERSEY.

GAS FILTER.

Application filed April 18, 1922. Serial No. 555,516.

*To all whom it may concern:*

Be it known that I, FRITZ FREDERICK UEHLING, a citizen of the United States, and resident of Passaic, in the county of Passaic and State of New Jersey, have invented certain new and useful Improvements in Gas Filters, of which the following is a specification, reference being had therein to the accompanying drawing.

This invention refers to means for filtering or cleansing a fluid or gas. The object is to provide a simple appliance having a wide variety of applications and intended to be built in many simple designs all having the same general purpose and construction. A cheap and efficient gas filter is very needful in various industries, and my improved device aims to supply this want.

With these and numerous other objects in view the invention may be said to consist essentially in the construction, arrangement and combination of parts, substantially as will be hereinafter described and then more specifically pointed out in the claims.

In the annexed drawing illustrating my invention:

Figure 1 is a sectional side elevation of my improved filtering means, operatively supported in its frame in the wall of a gas-filled chamber wherein it has the function of filtering the gas or fluid.

Figure 2 is a detail outside view of the cylindrical filter support or frame and its detachable head.

Figure 3 is a side elevation of the filter mechanism proper.

Figure 4 is a vertical section on the line 4, 4, of Figure 3.

Figure 5 is an outline view of my improved gas filter built in a plural or multistage form.

Figure 6 is a side view of an alternative form of the filter.

Figure 7 is a cross-section of the same on the line 7, 7, of Figure 6.

Similar characters of reference designate like parts throughout the different figures of the drawing.

I will first explain the construction of the filter mechanism proper and then describe the means for supporting it in position for use.

The preferred form of the filter is shown in Figures 3 and 4 where it is seen to consist of a pair of porous discs, or segments of any suitable porous filtering material, such for example, as porcelain or pumice stone. This filtering material may be any refractory material through which a gas will pass and be filtered or purified. These circular members are arranged in opposite sides of a circular casing 2 which is rebated on each side to receive the filtering members, and the latter are held securely in the rebates in the casing 2, by means of a centrally-disposed bolt 6 having on one end a head 6ª and washer 8, and on the other end a nut 7 and washer 8, all arranged so that when the nut 7 is tightened the two filtering members 1, 1, will be firmly held in the recessed edges of casing 2, and a space will thus be provided within said casing to receive the purified gas. This gas will pass off through a pipe nipple 3 which is internally screw-threaded at 4 and which communicates with the interior of the casing 2 through a passage 5. A pipe 10 for carrying the gas away is screwed into the nipple 3, as shown in Figure 1.

Obviously the filter casing, its interior chamber and the number of filtering members, may be changed or altered without altering the character of the effect of the combination, and one change of this kind is noted in Figures 6 and 7, where I show a single filtering disc 1ª in lieu of the two discs 1, 1, which single disc is bolted to a casing 24 by a bolt 23 having a head 27 and washer 26 and screwing into an inner nut or central member so that the disc 1ª will be held securely in the recessed or rebated edge of casing 24. Casing 24 has a threaded nipple 25 for the attachment of a pipe or conduit section, through which the gas which passes through the filtering material 1ª is conducted away to any desired point.

It often happens that to secure the best results the gas should be passed through successive filtering members or layers of filtering material; and in order to show a way of doing this I arrange a continuous mechanism of several filtering units one after the other to produce a multi-stage or multi-effect filter. Such a plural construction is indicated in Figure 5 where each unit consists of a casing 17 having filtering discs 18. One device has a pipe nipple 22 for the coupling of a gas conduit; both units have flanges 19 bolted together by means of bolts 20; and one device has a cover 19ª secured by bolts 21. The gas will enter through all the members 18, and will pass from one casing 17 to the next and so on.

To support the filter in operative position in a gas chamber I provide a cylindrical frame 9 that is held in the brick wall of said chamber, see Figure 1. This frame 9 has a cover 12 that is secured removably to the frame by bolts 13, that pass between ears 16, 16, on cover 12 and adjacent ears 15, 15, on frame 9, said bolts having heads 13ª and nuts 14. The cover 12 can be released and removed at any time by loosening and removing bolts 13, and can be securely fastened in place by tightening the nuts 14. Cover 12 has a central screw-threaded bearing for holding pipe 10, which pipe runs through frame 9 into the gas chamber and carries at the end thereof the filtering device which I have just explained in detail and which it exposes to the gas with which said chamber is filled. To the outside of the cover 12 is connected a pipe union or elbow 11 and any convenient amount of piping, conduits, or passages that receive the filtered gas from pipe 10 and carry it to any desired point in any preferred way.

The mode of use is apparent. By exposing the filter to a gas to be filtered, so that the porous discs 1 may be in contact with the gas, the latter will pass through them and its filtration be effected with ease and success. Also I find that by supporting the filter proper in the manner described in a horizontal barrel or cylinder, as 9, large enough in diameter to allow the introduction of the filter through it or its withdrawal through it, I am enabled to so locate the filter in the midst of a volume of gas that it will function in the desired manner. As to exact details, I am not to be restricted thereto, as many may be changed and varied within the purview of the claims, in order to suit the device for different uses in various locations.

Having thus described my invention, what I claim as new and desire to secure by Letters Patent is:

1. The combination with a filter, of an open-ended cylinder for carrying the same, said cylinder being supported in a gas chamber in a horizontal position, a removable cover for said cylinder, and a tubular member secured to the cover and also to the filter, substantially as and for the purposes set forth.

2. The combination with a filter, of a pipe connected thereto, a supporting frame for the pipe and filter consisting of a cylinder mounted in a gas chamber, and a cover for said chamber having a central opening in which the aforesaid pipe is secured, together with means for clamping the cover to the cylindrical frame.

3. The combination with a filter, of a pipe connected thereto, a supporting frame for the pipe and filter consisting of a cylinder mounted in a gas chamber, and a cover for said chamber having a central opening in which the aforesaid pipe is secured, together with means for clamping the cover to the cylindrical frame, and an external gas-conveying conduit or main likewise connected with the central opening in the frame cover.

In testimony whereof I hereunto affix my signature.

FRITZ FREDERICK UEHLING.